United States Patent
Gu et al.

(10) Patent No.: US 9,460,591 B2
(45) Date of Patent: Oct. 4, 2016

(54) EVENT NOTIFICATION

(71) Applicant: MivaLife Mobile Technology, Inc., George Town, KY (US)

(72) Inventors: Keqin Gu, Fremont, CA (US); Kuochun Lee, Fremont, CA (US); Shicong Wang, Emeryville, CA (US)

(73) Assignee: MivaLife Mobile Technology, Inc., Grand Cayman (KY)

( * ) Notice: Subject to any disclaimer, the term of this patent is extended or adjusted under 35 U.S.C. 154(b) by 267 days.

(21) Appl. No.: 13/624,764

(22) Filed: Sep. 21, 2012

(65) Prior Publication Data

US 2016/0217680 A1    Jul. 28, 2016

(51) Int. Cl.
*G08B 1/00* (2006.01)
*G08B 21/00* (2006.01)

(52) U.S. Cl.
CPC .......... *G08B 1/00* (2013.01); *G08B 21/00* (2013.01)

(58) Field of Classification Search
CPC ...... G08B 21/00; G08B 25/005; G08B 1/00; H04M 11/04
USPC .................................................. 340/500–599
See application file for complete search history.

(56) References Cited

U.S. PATENT DOCUMENTS

| | | | | |
|---|---|---|---|---|
| 7,554,445 B2* | 6/2009 | Script et al. | | 340/545.1 |
| 8,618,927 B2* | 12/2013 | Wohlert | | 340/531 |
| 2002/0177428 A1* | 11/2002 | Menard et al. | | 455/404 |
| 2010/0176949 A1* | 7/2010 | Emigh | | B60R 25/1004 340/572.1 |
| 2011/0136464 A1* | 6/2011 | Blair et al. | | 455/404.1 |
| 2012/0001754 A1* | 1/2012 | Kraus et al. | | 340/540 |
| 2012/0084857 A1* | 4/2012 | Hubner et al. | | 726/22 |
| 2012/0092161 A1* | 4/2012 | West | | 340/540 |

OTHER PUBLICATIONS

Translation of Chinese Office Action issued for Chinese Patent Application No. 201310582270.3, filed Sep. 18, 2013. Issued Jul. 3, 2015. 9 pages.

* cited by examiner

*Primary Examiner* — Jennifer Mehmood
*Assistant Examiner* — Omar Casillashernandez
(74) *Attorney, Agent, or Firm* — Fish & Richardson P.C.

(57) ABSTRACT

Methods, systems, and apparatus, including computer programs encoded on computer storage media, for event notification. One of the methods includes receiving an event from a security system; determining at least one contact to notify of the alert from a collection of contacts, the determining including applying one or more event notification rules, wherein the one or more event notification rules include one or more event notification rules specified by a user of the security system and wherein a number and identity of the at least one contact varies depending on the applicable rules of the one or more event notification rules; transmitting an event notification to the one or more determined contacts; and performing a security action based on feedback from one or more of the determined contacts.

26 Claims, 3 Drawing Sheets

EVENT NOTIFICATION

BACKGROUND

This specification relates to event notification management.

Conventional monitoring or security systems typically provide an event notification, in response to an event, to one or more individuals based on a prearranged and fixed sequence. In other conventional systems, an event notification can be sent to all individuals at once in response to an event, e.g., as a broadcast to all individuals associated with the system.

SUMMARY

A security or monitoring system can identify particular contacts, e.g., individuals associated with the security system, to send event notifications based on application of one or more rules. The contacts can include the owner as well as other individuals designated by the owner. The rules can include rules created by the owner of the security system as well as rules created by other contacts. The rules specify criteria for event notifications in response to particular events.

In general, one innovative aspect of the subject matter described in this specification can be embodied in methods that include the actions of receiving an event from a security system; determining at least one contact to notify of the alert from a collection of contacts, the determining including applying one or more event notification rules, wherein the one or more event notification rules include one or more event notification rules specified by a user of the security system and wherein a number and identity of the at least one contact varies depending on the applicable rules of the one or more event notification rules; transmitting an event notification to the one or more determined contacts; and performing a security action based on feedback from one or more of the determined contacts. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. One or more event notification rules are associated with specific contacts and are specified by the corresponding contact. An event notification rule associated with a specific contact specifies a notification disable time. Applying one or more event notification rules includes determining one or more event notification rules applicable to a particular type of event. Each event notification rule, when applied, identifies one or more contacts to notify in response to the received event. Performing a security action based on a feedback from one or more of the determined contacts includes cancelling the alert based on a response from a contact. Performing a security action based on feedback from one or more of the determined contacts includes resending the event notification after a specified time interval when the feedback is a failure to respond to the event notification. Performing a security action based on feedback from one or more of the determined contacts includes identifying one or more additional contacts to send event notifications to. Applying one or more event notification rules includes determining a geographic location of one or more contacts.

Particular embodiments of the subject matter described in this specification can be implemented so as to realize one or more of the following advantages. Rules provide a more flexible management of a security or monitoring system. An owner of a security system can specify one or more notification rules for providing event notifications to particular contacts. Individual contacts can provide rules specifying contact parameters indicating, for example, when or where they are available to receive event notifications. Rules can specify one or more fallback positions in response to received feedback or a failure to receive feedback in response to an event notification.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
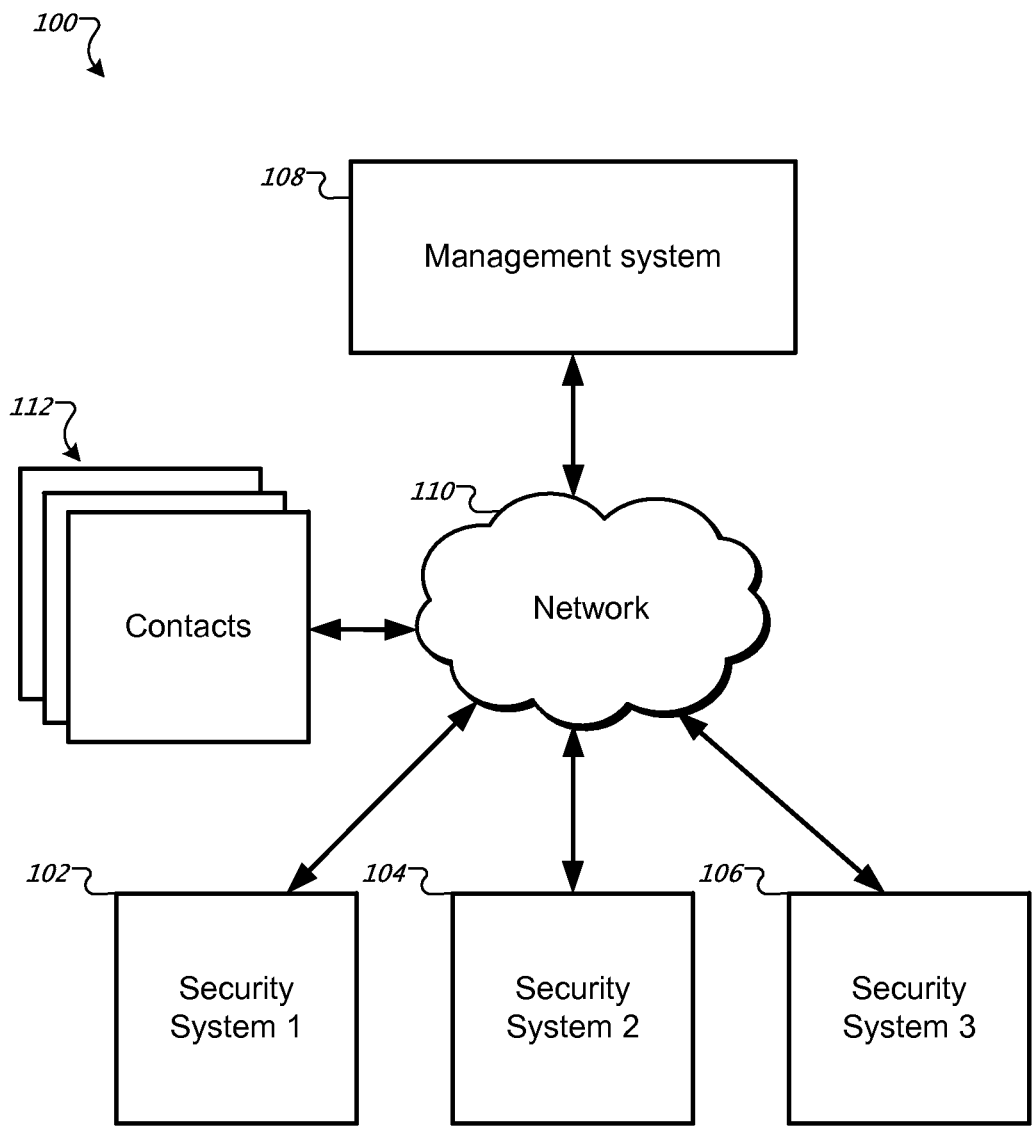
FIG. 1 is a diagram of an example system for managing multiple security systems.

FIG. 1 is a diagram of an example system 100 for managing multiple security systems. The system 100 includes security system 102, 104, and 106 communicatively coupled to a management system 108 through a network 110. Each security system 102, 104, or 106, can be a home security system or home monitoring system. The respective security systems can include one or more sensors, e.g., motion sensors, and/or one or more cameras.

When an event is triggered, for example, in response to a detected sensor event, the security system notifies the management system 108 through the network 110. The network 110 can include, e.g., a local area network (LAN) or wide area network (WAN), e.g., the Internet. The management system 108 can be server or cloud based. The management system 108 can be used to establish each security system 102, 104, and 106 (among others) and manage event notifications in response to triggered events received from respective security systems.

In particular, the management system 108 can determine one or more contacts 112 associated with a particular security system to notify in response to a received event from the security system. Each security system can be associated with one or more contacts 112. Notification rules, as will be described in greater detail below, can be used by the management system 108 to determine which contact or contacts 112 to be notified in response to a received event. Contacts can provide instructions in response to the received event notifications. The management system 108 can then apply the received instructions, for example, by sending additional event notifications to one or more other contacts as specified by the rules or by notifying the security system that the event has been cancelled, as will be described in detail below.

Figure 2:
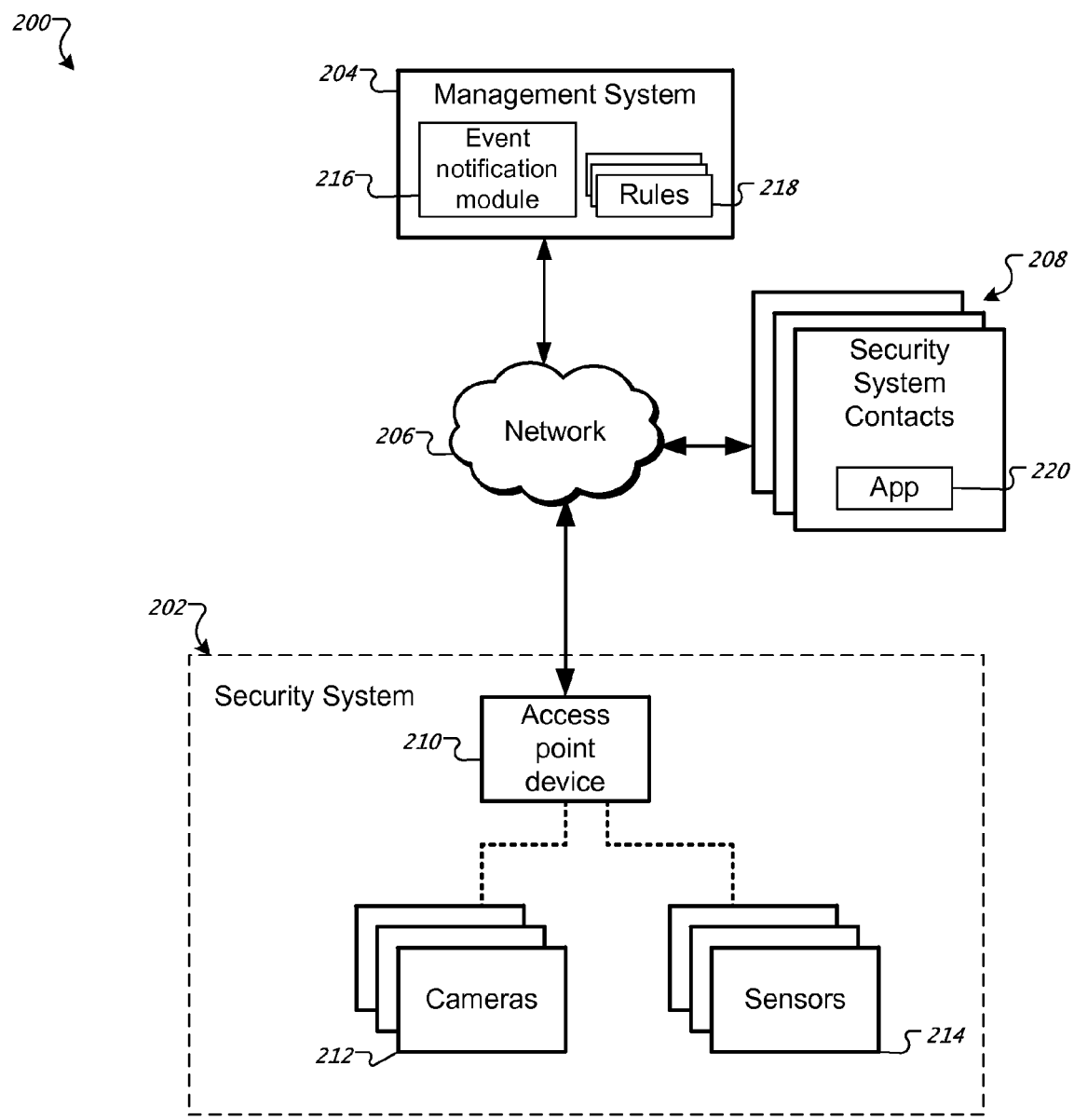
FIG. 2 is a diagram of an example system including a security system and a management system for providing event notifications to contacts of the security system.

FIG. 2 is a diagram of an example system 200 including a security system 202 and a management system 204 for providing event notifications to contacts 208 of the security system 202.

The security system 202 includes an access point device 210, one or more cameras 212, and one or more sensors 214. The access point device 210 is communicatively coupled with the management system 204 through a network 206. The access point device 210 receives alerts from the cameras 212 and sensors 214 and can communicate the alert to the management system 204 through a secure communication, e.g., encrypted message. In particular, the cameras 212 and sensors 214 can be positioned at strategic locations to provide security coverage. Sensors 214 can include sensors that detect movement or displacement, for example, detecting the opening of doors and windows. Sensors 214 can also include other sensors providing other useful information may be included such as doorbell sensors, smoke detector alarm sensors, flood sensors, temperature sensors, and/or environmental control sensors and/or controls.

The cameras 212, sensors 214, and access point device 210 can communicate in one-way or two-way communication using wired or wireless signals. In some implementations, the access point device 210 is a wireless router or is coupled to a wireless router. Similarly, each of the cameras 212 and sensors 214 can be a wireless enabled device. Communication can be established through a setup or configuration process that establishes the security system 202. In operation, when an event is triggered at a respective sensor 214 or camera 212, the access point device 210 is notified, e.g., through wireless communication. The access point device 210 can then communicate the event to the management system 204 for processing and generating event notifications as described below.

In some implementations, the security system 202 is a self-configuring secure wireless network that automatically establishes the secure wireless network upon power-up with little or no user interaction. The access point device 210 and one or more wireless enabled devices to be included in the secure wireless network, e.g., cameras 212 and sensors 214, are preprogrammed with a common Service Set Identifier (SSID) and common key that is used for establishing the secure wireless network. The common key may be a unique key which is associated with a user of the secure wireless network. Alternatively, the common key may be a default key that is the same for all access point devices and wireless enabled devices manufactured or distributed by a common source. Since the common SSID and common key are preprogrammed into the access point device and the wireless enabled devices, the access point device can automatically establish the secure wireless network upon power-up without further intervention by, and transparently to, the owner of the security system. Thus, upon powering up the wireless enabled devices, the access point device 210 establishes a secure wireless network using the common key. "Preprogrammed" in this sense means the common key has been retrievably stored in a memory of the respective devices.

In some implementations, a software agent is provided in the access point device 210 so that it automatically establishes a connection with the management system 204 when the access point device 210 has an available network connection. The management system 204 may also be connected to many other access point devices and their corresponding secure wireless networks, such as in the case of a home security service being connected to the many home security systems of its subscribers.

The management system 204 may request the access point device 210 to perform numerous tasks including updating a wireless key from the common key to a new key or from the new key to a newer key, transmitting data from wireless enabled network devices to authorized devices requesting such data, and adding new wireless enabled network devices to an established secure wireless network. The access point device 210 may be configured as an intelligent router or bridge. In addition to the controller, the access point device includes memory for storing information such as the common key, program code for the software agent, and other items described herein.

The management system 204 can be discrete computer system or as part of a cloud system including distributed computing devices. The management system 204 includes an event notification module 216 and rules 218. The event notification module 216 can determine whether to send event notifications and to which security system contacts 208 they are sent. The event notification module 216 can identify a group of one or more rules 218 for the specific security system 202 from which an event was received. After applying the rules to the received event, as described below, the event notification module 216 can initiate one or more corresponding event notifications. The rules 218 can be, e.g., a database including rule sets for each of a number of different security systems being managed by the management system 204.

The security system contacts 208 can include the owner of the security system and others points of contact. These other points of contact can include, for example, other family members of the owner, trusted individuals, e.g., a landlord or neighbor, as well as emergency services contacts, e.g., police or fire departments. Various security system contacts 208 can receive event notifications through a user device, e.g., a mobile device, tablet device, PDA, or personal computer. In particular, an application 220 installed on a respective user device 208, e.g., a mobile application installed on a mobile device, can provide an interface for receiving and responding to alerts as well as other interactions.

The application 220 can provide interaction with the management system 204. User devices e.g., mobile devices, tablet devices, etc., that are attempting to interact with the management system 204 may authenticate the particular contact to the management system 204, for example by providing information that uniquely identifies the requesting device, such as an Internet Protocol (IP) address, a product serial number, or a cell phone number. Alternatively, they may provide a user name and password which are authorized to interact with the management system 204. To facilitate such authorization procedures, the management system 204 may store or have ready access to such authorization information for each contact identified as associated with the security system 202.

Figure 3:
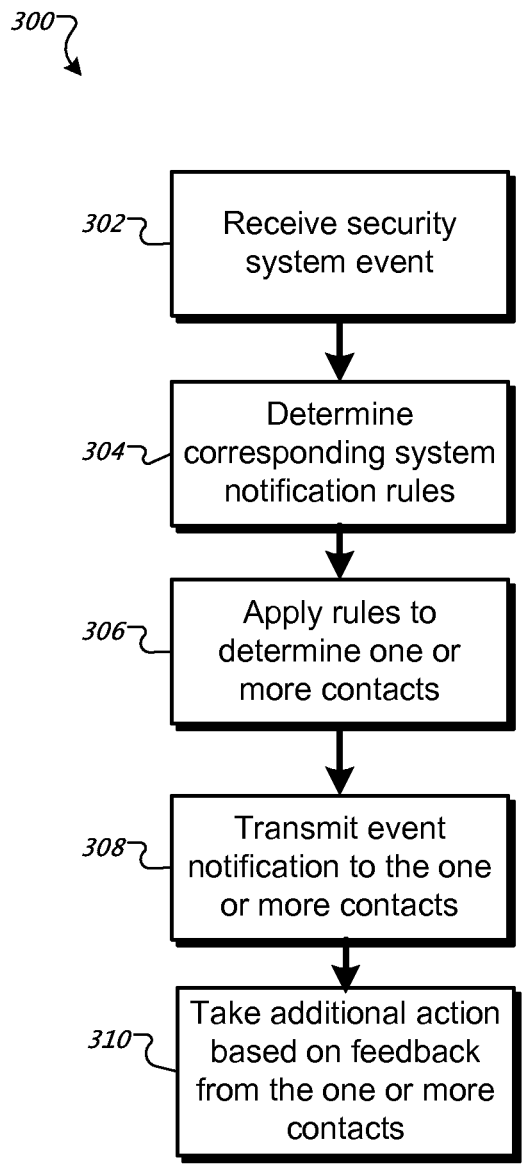
FIG. 3 is a flow diagram of an example method for providing event notifications to contacts of a security system.

FIG. 3 is a flow diagram of an example method 300 for providing event notifications to contacts of a security system. For convenience, the method 300 will be described with respect to a management system that performs the method 300, e.g., the management system 204 of FIG. 2.

The management system receives an event from a security system (302). The event can be received in response to a trigger occurring in a particular security system. For example, a particular sensor, e.g., a motion sensor, can detect movement. Based on the settings of the security system, this can trigger an event. For example, the movement can be detected as an event based on arming of the security system. The sensor that is triggered can communicate with a local system manager such as an access point device. The access point device can then send the event to the management system. In some implementations, the access point device performs some processing on the event prior to sending the event to the management system. For example, the access point device can perform filtering on events based on one or more rules, e.g., the access point device can include a rule not to send events to the management system between certain hours.

The management system identifies a corresponding group of rules for the security system (304). The management system determines which security system sent the event. For example, the management system may be managing many different security systems. The event can be included in communication that has a unique identifiers associated with the source security system. Other identification techniques can be used to determine the source security system. Once the source security system has been determined, the system identifies the group of one or more rules that is associated with the security system. The rules can be maintained in a database on the management system.

The management system applies the group of one or more rules to the event (306). Each rule describes a notification response based on one or more criteria. For example, each potential contact for the security system can have an associated rule or rules that identify criteria for sending them an event notification. In particular, the owner of the security system, or designated manager of the security system can specify one or more notification rules. The rules can identify an event notification contact based on a number of different criteria including an event type, a time of the event, a location of one or more contacts, and contact restrictions of the one or more contacts, e.g., time windows.

Table 1 shows an example set of rules for an owner contact:

TABLE 1

| Sensor Trigger | Rule | Contact 1 | Contact 2 | Contact 3 |
|---|---|---|---|---|
| Window Break Sensor | All | Uncle Sam | Brother Jack | Neighbor Tom |
| Kitchen Flood Sensor | Closest first | Neighbor Tom | Brother Jack | Uncle Sam |
| Living Room Motion Sensor | First to last | Uncle Sam | Brother Jack | Neighbor Tom |

For each event type, there is a corresponding rule identifying criteria for sending event notifications and one or more contacts. For example, when the event is a window break sensor, the rule is to notify all of the identified contacts, which are Uncle Same, Brother Jack, and Neighbor Tom. By contrast, when the event is a kitchen flood sensor, the rule is to notify the closest contact first, e.g., based on GPS location of a corresponding security system application on a mobile device of the contact. Thus, the closest contact of the three contacts will be notified first. In another example, a living room motion sensor has a rule to notify contacts in order from first to last. Whether or not a next contact is sent an event notification can depend upon the response, or lack of response, from a notified contact.

In some implementations, each contact can have additional rules that can be applied in concert with one or more other rules. For example, an individual contact can include restrictions on when the can be notified based, for example, on time of day or location. An example rule is provided below:

Rule for Uncle Sam for Owner Jane: Disable time: 10:00 pm-6:00 am.

A given contact that is a contact for more than one security system can specify notification rules for each individual owner. In this example, for the security system owned by Jane, Uncle Sam indicates that be is not to receive event notifications between the hours of 10:00 am and 6:00 am.

The management system sends an event notification to one or more contacts based on the application of the rules (308). For example, if the living room motion sensor is triggered at midnight, the combination of the applied rules would skip notifying "Uncle Sam" since it is within the disable time and will first send a notification to "Brother Jack."

The event notification can take the form of a push notification to the contact's mobile device, a text message (e.g., SMS), e-mail, or automated telephone call. The contact's mobile device can include a security system application installed. The application can periodically transmit location data to the management system, e.g., using local GPS or other geolocation information. Additionally, the application can provide an interface for receiving input in response to an event notification. Additionally, the contact can use the application to input rule information, for example, notification time restrictions as described above.

The management system takes additional action based on feedback from the one or more contacts that received an event notification (310). Example actions include cancelling the event, providing additional information, or alerting authorities. For example, if the contact selects a cancel alert option, the management system can send a reset or other cancellation to the security system. If the contact selects an "alert authorities" option, an appropriate authority can be contacted depending on the type of event. For example, if the event is a window break sensor, the police can be contacted.

In some instances, a phone call is initiated to the local police. In some other instances, the contact is put in communication with the authority directly. Additionally, when contacting an authority is initiated, e.g., the police, the management system can have the security system initiate an audible alarm. In some implementations, the management system broadcasts an event notification to other contacts, for example, warning them to stay away.

In some implementations, the contact can request additional information about the event in response to receiving the event notification. For example, the contact can request a camera image or video associated with the event. The management system can obtain an image or video from the security system from one or more cameras, e.g., camera's nearby or capturing a region relevant to the event. For example, a camera that captures a window having a triggered window break sensor. The management system can then send one or more camera images or videos contemporaneous with the event to the contact for viewing through the security application. The contact can then provide additional feedback in view of the images or videos. Other information that a contact may request can include sensor data such as temperature, shock level, or other measurable parameters.

Additionally, the feedback from the one or more contacts can be a failure to respond. For example, if a first contact fails to respond to the event notification, a next contact can be notified based on the applicable rule. Alternatively, a repeat of the event notification can be sent after a specified amount of time has elapsed from the initial event notification. In some implementations, event notifications are broadcast to a wider group of contacts when a response is not received from one or more contacts identified by the applicable rules.

In some other implementations, if no contact responds to a notification based on the rule including, for example, subsequent attempts, a police, fire, or ambulance contact can be notified depending on the particular type event. For example, the police can be contacted in response to a window break sensor being triggered while the fire department can be contacted in response to a smoke sensor being triggered.

In some implementations, other types of event notifications can be provided, e.g., based on specified rules. An owner can specify different types of event notifications that are sent to different types of contacts. For example, when an event is triggered indicating a break-in may be occurring, e.g., a window break sensor or motion sensor is triggered, in addition to sending an event notification to a contact for a response, the management system can send one or more "stay away" notifications to one or more contacts, e.g., children or others living in the home where the event occurred. Additionally, information can be provided to an owner contact along with the event notification such as a current location of other contacts. The owner contact can use this information in responding to the event notification. For example, the owner contact can transfer the event notification to another contact that is closer. In yet some other implementation, more general event notifications can be provided. For example, in response to monitoring for weather or other emergency data, event notifications can provide warnings to one or more contacts, e.g., based on the contact's location.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising: receiving, at a security management system, an event from a first security system of a plurality of security systems associated with the security management system, wherein each security system of the plurality of security systems includes one or more sensors or cameras; in response to receiving the event, determining a group of rules for the first security system, wherein the group of rules are specified by an owner of the first security system; applying the determined group of rules to the event, wherein each rule describes a particular notification response for a corresponding event type including one or more contacts, wherein each event type has one or more associated rules that each identify one or more criteria for sending a respective event notification to one or more contacts and identify a corresponding ordering of contact notifications associated with the rule based on the criteria, and wherein applying the group of rules includes determining one or more rules for the event and for each of the one or more determined rules: determining at least a first contact to notify in response to the received event from a collection of contacts, wherein an identity of the first contact is specified by the owner and varies depending on the applicable rules of the group of rules, and wherein at least two rules of the group of rules specify distinct first contacts, and wherein one or more rules of the group of rules specify multiple first contacts; transmitting an event notification to at least the first contact; performing a security action based on feedback from one or more of the determined contacts wherein transmitting an event notification includes transmitting, to at least the first contact, location information of other contacts of the collection of contacts; and wherein performing a security action based on feedback includes receiving an instruction from the first contact transferring the event notification to another contact.

2. The method of claim 1, wherein one or more of the rules are associated with one or more user specified contacts to notify if the first contact fails to respond to the event notification.

3. The method of claim 1, wherein each contact is associated with one or more additional rules for notifying the specific contact that are applied with the associated rule, wherein the one or more additional rules for the specific contact include a notification disable time range.

4. The method of claim 1, wherein applying the group of rules includes determining one or more rules applicable to a particular type of event.

5. The method of claim 1, wherein performing a security action based on a feedback from one or more of the determined contacts includes cancelling the alert based on a response from a notified contact.

6. The method of claim 1, wherein performing a security action based on feedback from one or more of the determined contacts includes resending the event notification after a specified time interval when the feedback is a failure to respond to the event notification.

7. The method of claim 1, wherein performing a security action based on feedback from one or more of the determined contacts includes identifying one or more additional contacts to send event notifications to.

8. The method of claim 1, wherein applying one or more rules includes determining that a particular rule specifies geographic criteria and determining a geographic location of each of the one or more contacts specified for the particular rule.

9. A system comprising: one or more computers configured to perform operations comprising: receiving, at a security management system, an event from a first security system of a plurality of security systems associated with the security management system, wherein each security system of the plurality of security systems includes one or more sensors or cameras; in response to receiving the event, determining a group of rules for the first security system, wherein the group of rules are specified by an owner of the first security system; applying the determined group of rules to the event, wherein each rule describes a particular notification response for a corresponding event type including one or more contacts, wherein each event type has one or more associated rules that each identify one or more criteria for sending a respective event notification to one or more contacts and identify a corresponding ordering of contact notifications associated with the rule based on the criteria, and wherein applying the group of rules includes determining one or more rules for the event and for each of the one or more determined rules: determining at least a first contact to notify in response to the received event from a collection of contacts, wherein an identity of the first contact is specified by the owner and varies depending on the applicable rules of the one or more event notification group of rules, and wherein at least two rules of the group of rules specify distinct first contacts, and wherein one or more rules of the group of rules specify multiple first contacts; transmitting an event notification to at least the first contact; performing a security action based on feedback from one or more of the determined contacts wherein transmitting an event notification includes transmitting, to at least the first contact, location information of other contacts of the collection of contacts; and wherein performing a security action based on feedback includes receiving an instruction from the first contact transferring the event notification to another contact.

10. The system of claim 9, wherein one or more of the rules are associated with one or more user specified contacts to notify if the first contact fails to respond to the event notification.

11. The system of claim 9, wherein each contact is associated with one or more additional rules for notifying the specific contact that are applied with the associated rule, wherein the one or more additional rules for the specific contact include a notification disable time range.

12. The system of claim 9, wherein applying the group of rules includes determining one or more rules applicable to a particular type of event.

13. The system of claim 9, wherein performing a security action based on a feedback from one or more of the determined contacts includes cancelling the alert based on a response from a notified contact.

14. The system of claim 9, wherein performing a security action based on feedback from one or more of the determined contacts includes resending the event notification after a specified time interval when the feedback is a failure to respond to the event notification.

15. The system of claim 9, wherein performing a security action based on feedback from one or more of the determined contacts includes identifying one or more additional contacts to send event notifications to.

16. The system of claim 9, wherein applying one or more rules includes determining that a particular rule specifies geographic criteria and determining a geographic location of each of the one or more contacts specified for the particular rule.

17. A non-transitory computer storage medium encoded with a computer program, the program comprising instructions that when executed by one or more computers cause the one or more computers to perform operations comprising: receiving, at a security management system, an event from a first security system of a plurality of security systems associated with the security management system wherein each security system of the plurality of security systems includes one or more sensors or cameras; in response to receiving the event, determining a group of rules for the first security system, wherein the group of rules are specified by an owner of the first security system; applying the determined group of rules to the event, wherein each rule describes a particular notification response for a corresponding event type including one or more contacts, wherein each event type has one or more associated rules that each identify one or more criteria for sending a respective event notification to one or more contacts and identify a corresponding ordering of contact notifications associated with the rule based on the criteria, and wherein applying the group of rules includes determining one or more rules for the event and for each of the one or more determined rules: determining at least a first contact to notify in response to the received event from a collection of contacts, wherein an identity of the first contact is specified by the owner and varies depending on the applicable rules of the group of rules, and wherein at least two rules of the group of rules specify distinct first contacts, and wherein one or more rules of the group of rules specify multiple first contacts; transmitting an event notification to at least the first contact; performing a security action based on feedback from one or more of the determined contacts wherein transmitting an event notification includes transmitting, to at least the first contact, location information of other contacts of the collection of contacts; and wherein performing a security action based on feedback includes receiving an instruction from the first contact transferring the event notification to another contact.

18. The method of claim 1, further comprising providing one or more captured images or video associated with the event to the first contact.

19. The method of claim 1, wherein performing a security action based on feedback from one or more of the determined contacts includes receiving feedback to alert authorities.

20. The method of claim 19, wherein in response to receiving feedback to alert authorities event notifications are broadcast to one or more additional contacts warning them to stay away.

21. The method of claim 1, wherein transmitting an event notification to at least the first contact includes transmitting the event notification as two or more of a push notification, a text message, an e-mail, or a telephone call.

22. The method of claim 1, wherein performing a security action based on feedback from one or more of the determined contacts includes alerting one or more authorities depending on the event type after a specified time interval when the feedback is a failure to respond to the event notification.

23. The method of claim 1, wherein the rules of the group of rules specify different types of event notifications that are sent to different types of contacts of the collection of contacts.

24. The method of claim 23, wherein the different types of event notifications include "stay away" notifications.

25. The method of claim 23, wherein the different types of contacts include the owner and contacts designated by the owner.

26. The method of claim 23, wherein the types of event notifications sent depend upon the type of event and an authorization of the type of contact.

\* \* \* \* \*